(12) United States Patent
Ibayashi et al.

(10) Patent No.: US 8,893,577 B2
(45) Date of Patent: Nov. 25, 2014

(54) UMBILICAL MEMBER ARRANGEMENT UNIT OF ROBOT ARM SECTION

(75) Inventors: Jun Ibayashi, Yamanashi (JP);
Munehiro Jinushi, Yamanashi (JP);
Hirokazu Kume, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 734 days.

(21) Appl. No.: 13/032,779

(22) Filed: Feb. 23, 2011

(65) Prior Publication Data

US 2011/0252913 A1     Oct. 20, 2011

(30) Foreign Application Priority Data

Apr. 14, 2010   (JP) ................................. 2010-093219

(51) Int. Cl.
*B25J 17/00*   (2006.01)
*B25J 17/02*   (2006.01)
*B25J 18/00*   (2006.01)
*B25J 19/00*   (2006.01)

(52) U.S. Cl.
CPC ............ *B25J 19/0025* (2013.01); *Y10S 901/29* (2013.01)
USPC .......................................... 74/490.02; 901/29

(58) Field of Classification Search
CPC ...... B25J 17/0266; B25J 17/0283; B25J 9/06; B25J 9/104; B25J 9/102; B25J 9/042; B25J 19/0029; B25J 19/0025
USPC ............... 74/490.01, 490.02, 490.05, 490.06; 901/19, 27, 28, 29
See application file for complete search history.

(56) References Cited

U.S. PATENT DOCUMENTS

| | | | | |
|---|---|---|---|---|
| 5,484,219 | A | * | 1/1996 | Drew et al. ..................... 403/57 |
| 7,202,442 | B2 | * | 4/2007 | Nakagiri et al. ........... 219/137.9 |
| 7,488,199 | B2 | * | 2/2009 | Gonzalez ...................... 439/502 |

(Continued)

FOREIGN PATENT DOCUMENTS

| | | |
|---|---|---|
| DE | 10018773 A1 | 10/2001 |
| DE | 10245984 A1 | 4/2004 |

(Continued)

OTHER PUBLICATIONS

A German Office Action, dated Apr. 18, 2012 issued in DE Application No. 10 2011 013 824.2.

(Continued)

*Primary Examiner* — Troy Chambers
*Assistant Examiner* — Alexander Vu
(74) *Attorney, Agent, or Firm* — Lowe Hauptman & Ham, LLP

(57) ABSTRACT

An umbilical member arrangement unit of a robot arm section for avoiding interference between the umbilical member and external equipment has a first fixing member attached to a nonrotating part and adapted to nonslidably fix the umbilical member, and a second fixing member attached to a rotating part so as to integrally rotate with the rotating part and adapted to nonslidably fix the umbilical member. When the rotating part is positioned at a center position of a rotational motion range thereof about the longitudinal axis, the first and second fixing members direct the umbilical member along first and second tangential lines, respectively, the two tangential lines being generally perpendicular to each other, and, the fixing members are positioned in the same region in relation to two regions defined by a boundary plane parallel to the second tangential line, on which the longitudinal axis lies.

4 Claims, 5 Drawing Sheets

(56) References Cited

U.S. PATENT DOCUMENTS

| | | | |
|---|---|---|---|
| 7,622,001 B2* | 11/2009 | Inada et al. ............... | 118/323 |
| 7,631,573 B2* | 12/2009 | Kidooka et al. ........... | 74/490.02 |
| 7,905,472 B2 | 3/2011 | Nakano et al. | |
| 8,371,189 B2* | 2/2013 | Ibayashi et al. ........... | 74/490.02 |
| 2006/0104791 A1* | 5/2006 | Nihei et al. ................ | 414/737 |
| 2006/0196300 A1* | 9/2006 | Kidooka et al. ........... | 74/490.01 |
| 2006/0258229 A1 | 11/2006 | Harada et al. | |
| 2007/0031232 A1* | 2/2007 | Kurebayashi et al. ..... | 414/682 |
| 2008/0177284 A1* | 7/2008 | Lee et al. ................... | 606/130 |
| 2008/0229861 A1* | 9/2008 | Inoue et al. ................ | 74/490.01 |
| 2008/0258402 A1* | 10/2008 | Tamura et al. ............. | 277/345 |
| 2010/0038495 A1* | 2/2010 | Jinushi et al. .............. | 248/68.1 |
| 2010/0162845 A1 | 7/2010 | Yonehara et al. | |
| 2011/0252913 A1* | 10/2011 | Ibayashi et al. ............ | 74/490.02 |

FOREIGN PATENT DOCUMENTS

| | | |
|---|---|---|
| DE | 112005001432 T5 | 5/2007 |
| JP | 08112796 | 5/1996 |
| JP | 2003-136462 A | 5/2003 |
| WO | 2009069389 | 6/2009 |

OTHER PUBLICATIONS

Japanese Office Action for Application No. 2010-93219 mailed Jun. 21, 2011.

* cited by examiner

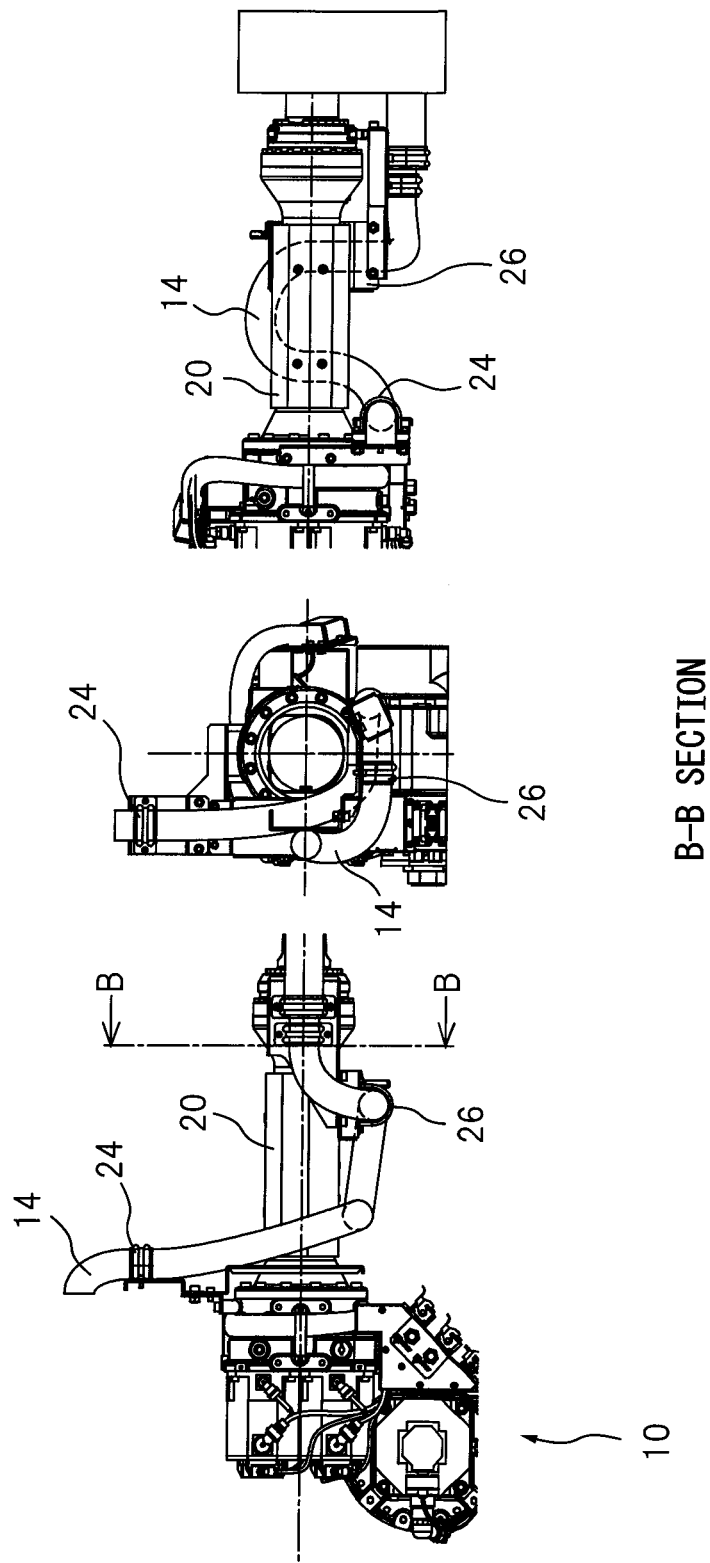

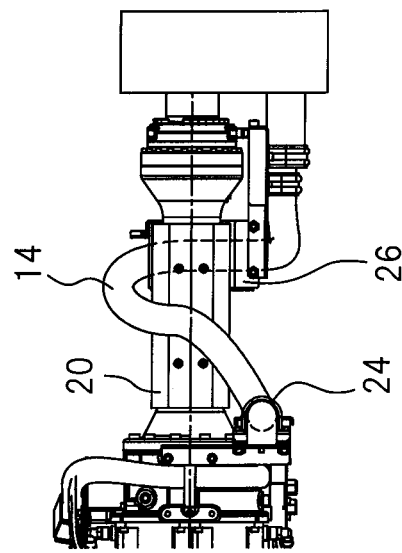
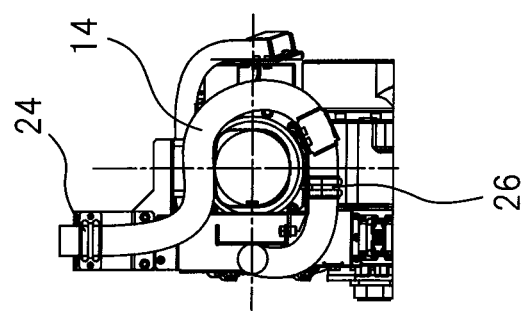
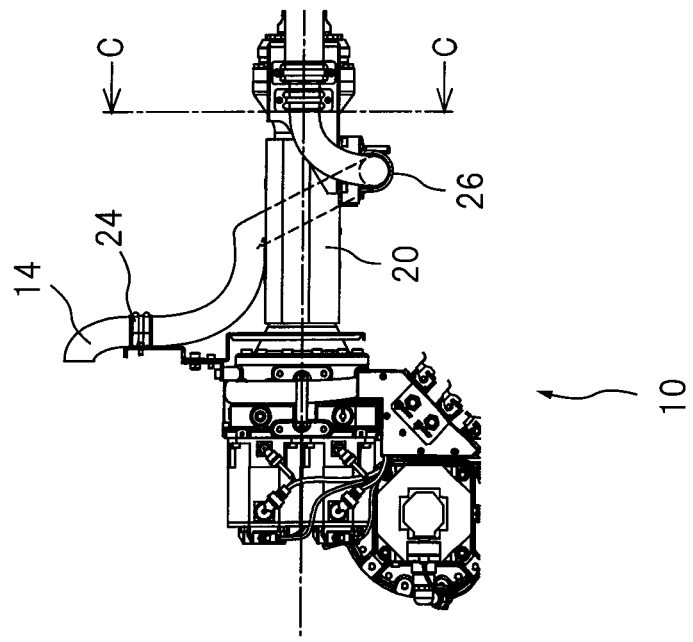

UMBILICAL MEMBER ARRANGEMENT UNIT OF ROBOT ARM SECTION

RELATED APPLICATIONS

The present application claims priority from Japanese Patent Application No. 2010-93219, filed on Apr. 14, 2010, the entire contents of which are fully incorporated herein by reference.

BACKGROUND OF THE INVENTION

1. Field of the Invention

The preset invention relates to an arrangement unit for an umbilical member arranged at a robot arm section of an industrial robot.

2. Description of the Related Art

When an industrial robot is used for an operation, the robot is required to be provided with an umbilical member including a cable for transmitting power or a signal and/or a tube for transmitting coolant or activation gas to a hand or a welding gun attached to the end of a wrist section of the robot, via a forearm of the robot. It is necessary that the umbilical member, arranged around the forearm of the robot, has a certain amount of extra length (margin) so that excess force is not applied to the umbilical member while the rotation of the forearm. On the other hand, the extra length of the umbilical member may be slack depending on the position and/or the orientation of the forearm of the robot, and the umbilical is required to not interfere with external equipment, such as a neighboring robot, a hand, a jig, workpiece, etc.

For example, Japanese Unexamined Patent Publication No. 2003-136462 discloses a guide member for avoiding interference due to extra length of an umbilical member. Concretely, it is described that guide member 15 is a cylindrical member arranged coaxially with an upper arm 1, and configured to cover a welding cable 7 wound around upper arm 1 so that welding cable 7 is retained within an annular space between upper arm 1 and guide member 15.

In the configuration of Japanese Unexamined Patent Publication No. 2003-136462, the umbilical member is restrained by the guide member. Therefore, excess force may be applied to the restrained portion of the umbilical member, and thus the durability of the umbilical member may be affected. Further, when the umbilical member is replaced with another, removing and attaching operations of the umbilical member relative to the guide member must be carried out, such operations are troublesome for an operator.

SUMMARY OF THE INVENTION

Therefore, an object of the present invention is to provide an umbilical member arrangement unit of a robot arm section, capable of effectively avoiding interference between the umbilical member and external equipment, without using a guide member or the like.

To this end, according the present invention, there is provided an arrangement unit for an umbilical member at a robot arm section, the umbilical member extending to an end effector attached to a front end of a wrist section via a forearm of an industrial robot, the umbilical member being constituted by at least one of a cable adapted to supply power or a signal to the end effector and a tube adapted to supply coolant or activation air to the end effector, the arrangement unit comprising: a nonrotating part having a longitudinal axis extending along a longitudinal direction of the forearm; a rotating part rotatably attached to one end of the nonrotating part about the longitudinal axis; a first fixing member attached to the nonrotating part, wherein the umbilical member is nonslidably fixed to the first fixing member; and a second fixing member attached to the rotating part so that the second fixing member may integrally rotate with the rotating part, wherein the umbilical member is nonslidably fixed to the second fixing member, wherein the second fixing member is positioned at a place where is separated from the first fixing member in the direction of the longitudinal axis by a distance larger than a size of the umbilical member in a cross-sectional direction thereof, the cross-sectional direction being perpendicular to a longitudinal direction of the umbilical member, and wherein, when the rotating part is positioned at a center position of a rotational motion range thereof about the longitudinal axis, the first fixing member is arranged so as to direct the umbilical member, viewed in the direction of the longitudinal axis, along a first tangential line of a circle having a center coinciding with the longitudinal axis, and the second fixing member is arranged so as to direct the umbilical member, viewed in the direction of the longitudinal axis, along a second tangential line of the circle, the second tangential line being generally perpendicular to the first tangential line, and, the first and second fixing members are positioned in the same region in relation to two regions defined by a boundary plane on which the longitudinal axis lies, the boundary plane being parallel to the second tangential line.

In a preferred embodiment, the umbilical member is constituted by combining and integrally twisting a plurality of cables or tubes so as to form a bundle.

In a preferred embodiment, the twisting direction or an amount of the twisting of the plurality of cables or tubes per unit of length is determined so that the umbilical member does not outwardly projects in a twisting radial direction of thereof.

In a preferred embodiment, the umbilical member has at least one of a cover adapted to enclose the umbilical member and a coil spring through which the umbilical member extends.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 1a is a side view of a robot forearm including an arrangement unit for an umbilical member of the invention;

FIG. 1b is a cross-sectional view along A-A line of FIG. 1a;

FIG. 1c is a top view of the configuration of FIG. 1a;

FIG. 3a is a side view showing the state wherein a second fixing member rotates from the state of FIG. 1a;

FIG. 3b is a cross-sectional view along B-B line of FIG. 3a;

FIG. 3c is a top view of the configuration of FIG. 3a;

FIG. 4a is a side view showing the state wherein the second fixing member rotates from the state of FIG. 1a in the opposite direction of the direction of FIG. 3a;

FIG. 4b is a cross-sectional view along C-C line of FIG. 4a;

FIG. 4c is a top view of the configuration of FIG. 4a;

DETAILED DESCRIPTIONS

Figure 1:
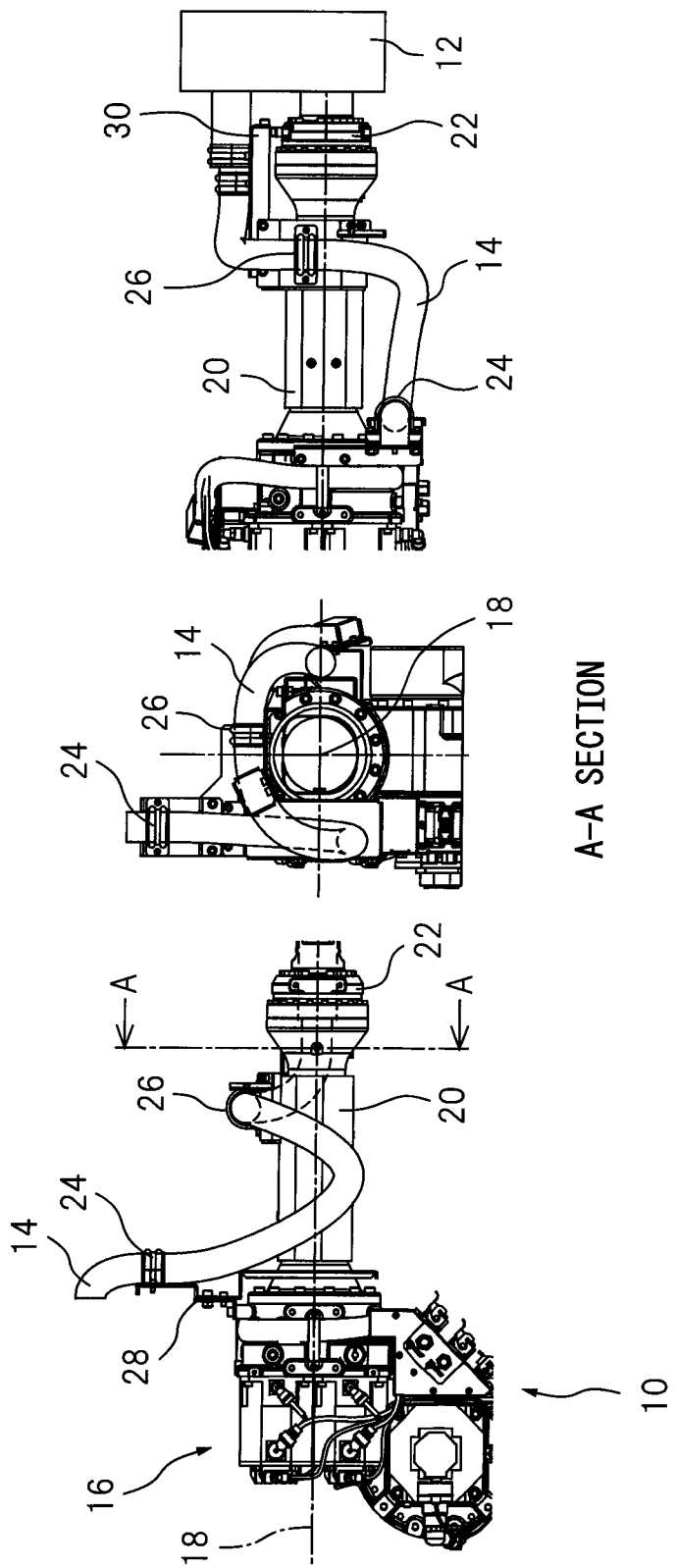

FIGS. 1a to 1c show a preferred embodiment of the invention; concretely, a side view (FIG. 1a) of an arrangement unit for an umbilical member 14 extending to an end effector 12 attached to a front end of a wrist section via a forearm 10 of an industrial robot, a cross-sectional view (FIG. 1b) along A-A line of FIG. 1a, and a top view (FIG. 1c) of the configuration of FIG. 1a. Forearm 10 has an arm section 20 having generally a cylindrical or a truncated cone shape and extending along a longitudinal axis 18 of forearm 20 from a base section 16. At a front end of arm section 20, a wrist section or rotating part 22 is attached rotatably about longitudinal axis 18.

Umbilical member 14 is a flexible member including at least one of a cable adapted to supply power or a signal to end effector 12 and a tube adapted to supply coolant or activation air to end effector 12. As described below, it is preferable that the umbilical member is not fully flexible, and has a certain degree of elasticity or rigidity. Umbilical member 14 extends from a supply source (not shown) for supplying power, a signal, coolant or activation air, and is fixed to a first fixing member 24 attached to a nonrotating part which corresponds to base section 16 or cannot rotate relative to base section 16. Further, umbilical member 14 is fixed to a second fixing member 26 attached to rotating part 22 and adapted to rotate integrally with rotating part 22, and is connected to end effector 12. In this regard, umbilical member 14 is nonslidably fixed to the first and second fixing members (i.e., the umbilical member is not moved relative to the fixing members in the longitudinal direction of the umbilical member). Although each fixing member is illustrated as a ring-shaped member adapted to clamp umbilical member 14 from the outside thereof, each fixing member is not limited to such a member as long as each fixing member can nonslidably fix umbilical member 14.

First fixing member 24 may be attached to any portion of forearm 10 as long as the portion corresponds to the nonrotating part. In the illustrated embodiment, first fixing member 24 is attached to a bracket 28 (FIG. 1a) which is separated from an outer surface of arm section 20 and extends from near a coupling portion between base section 16 and arm section 20 in the direction generally perpendicular to axis 18. On the other hand, second fixing member 26 is configured to integrally rotate with rotating part 22. In the illustrated embodiment, second fixing member 26 is attached to a stay member 30 (FIG. 1c) which is attached to rotating part 22 and extends from rotating part 22 toward base section 16 in the direction of axis 18. Although the attachment positions of the fixing members are not limited to the illustrated embodiment, the distance between the two fixing members in the direction of axis 18 is larger than at least a size (for example, a diameter) of umbilical member 14 in a cross-sectional direction thereof, the cross-sectional direction being perpendicular to a longitudinal direction of umbilical member 14.

Figure 2:
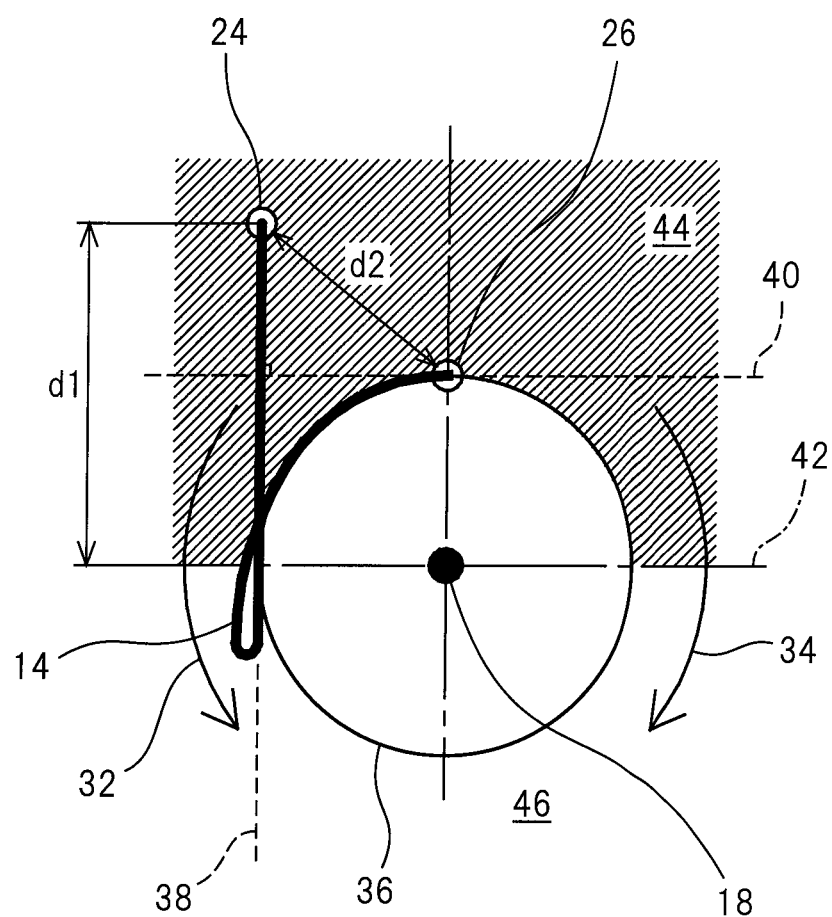
FIG. 2 is a view schematically showing the configuration of FIG. 1b.

FIG. 1b is a cross-sectional view along A-A line of FIG. 1a, concretely, a view of forearm 10 viewed in the direction of longitudinal axis 18 and in the direction toward the base section from the end effector, and FIG. 2 schematically shows FIG. 1b. The arrangement of umbilical member 14 in FIG. 1b (or FIG. 2) shows a state wherein a rotational angular position of rotating part 22 corresponds to the center of a rotational angular range of rotating part 22 about axis 18. In derail, rotating part 22 may rotate by 180 degrees in each direction of arrows 32 and 34, from the center position as shown in FIG. 2. In the state of FIG. 2, the position and the orientation of first fixing member 24 is determined so that first fixing member 24 is separated from a circle 36 representing an outer surface of arm section 20, and umbilical member 14 extending from first fixing member 24 to second fixing member 26 contacts circle 36 along a first tangential line 38 of circle 36 (or downward extends in the vertical direction). On the other hand, the position and the orientation of second fixing member 26 is determined so that the extending direction of umbilical member 14 at second fixing member 26 toward the end effector corresponds to a second tangential line 40 (preferably, the horizontal direction) of circle 36, wherein second tangential line 40 is generally perpendicular to first tangential line 38. Although second fixing member 26 may be separated from circle 36, it is preferable that umbilical member 14 extending from second fixing member 26 toward the end effector contacts circle 36 along a first tangential line 38 of circle 36 (or downward extends in the vertical direction). In addition, although second fixing member 26 may be separated from circle 36, it is preferable that second fixing member 26 be arranged so that umbilical member 14 extending from second fixing member 26 toward the end effector contacts outer surface 36 of arm section 20, as shown in FIG. 2, in order to properly arrange umbilical member 14 on arm section 20.

In view of a state wherein rotating part 22 rotates in the direction of an arrow 32 by 180 degrees from the state of FIG. 2, the length of the umbilical member between the first and second fixing members is equal to or larger than a summation of distance d1 and one quarter of a circumferential length of circle 36, distance d1 corresponding to the length of umbilical member between first fixing member 24 and a place where umbilical member comes into contact with circle 36. On the other hand, in view of a state wherein rotating part 22 rotates in the direction of an arrow 34 by 180 degrees from the state of FIG. 2, the length of the umbilical member between the first and second fixing members is equal to or larger than a summation of distance d2 and one half of the circumferential length of circle 36, distance d2 corresponding to the distance between the first and second fixing members.

As shown in FIG. 2, in relation to a boundary plane 42 on which longitudinal axis 18 lies, the boundary plane being parallel to second tangential line 40, a region outside arm section 20 is divided into two regions, i.e., an upper region 44 (or a shaded area) above boundary plane 42, and a lower region 46 below boundary plane 42. In this regard, both first fixing member 24 and second fixing member 26 are positioned in one of the regions (in upper region 44 in the illustrated embodiment). Although the fixing members may be positioned in either region, upper region 44 is preferable since umbilical member 14 easily lies on arm section 20 due to the gravity assist.

According to the configuration as shown in FIG. 1b (or FIG. 2), umbilical member 14 extending between first fixing member 24 and second fixing member 26 does not widely project from arm section 20, and does not interfere with external equipment or the like without using a guide member or the like for the umbilical member.

FIGS. 3a to 3c show the arrangement of umbilical member 14 when rotating part 22 rotates in the direction of arrow 32 by 180 degrees from the state of FIG. 2, i.e., second fixing member 26 is rotated toward first tangential line 38 by 180 degrees. As shown in the side view (FIG. 3a), the position and the orientation of first fixing member 24 are not changed from those of FIG. 1a, and second fixing member 26 is moved below arm section 20. As shown in the top view (FIG. 3c), umbilical member 14 represents generally an U-shape and lies on the outer surface of arm section 20 and/or rotating part 22, whereby umbilical member 14 does not widely project from arm section 20 without using a guide member or the like.

On the other hand, FIGS. 4a to 4c show the arrangement of umbilical member 14 when rotating part 22 rotates in the direction of arrow 34 by 180 degrees from the state of FIG. 2, i.e., second fixing member 26 is rotated away from first tangential line 38 by 180 degrees. As shown in the side view (FIG. 4a), the position and the orientation of first fixing member 24 are not changed from those of FIG. 1a, and second fixing member 26 is moved below arm section 20. As shown in the top view (FIG. 4c), umbilical member 14 represents generally an arc-shape and lies on the outer surface of arm section 20 and/or rotating part 22, whereby umbilical member 14 does not widely project from arm section 20 without using a guide member or the like. Therefore, at any angular position of rotating part 22, umbilical member 14 may be arranged on or near arm section 20 without using the guide member or the like, whereby the umbilical member is prevented from being separated from arm section 20 and interfering with external equipment or the like.

Figure 5:
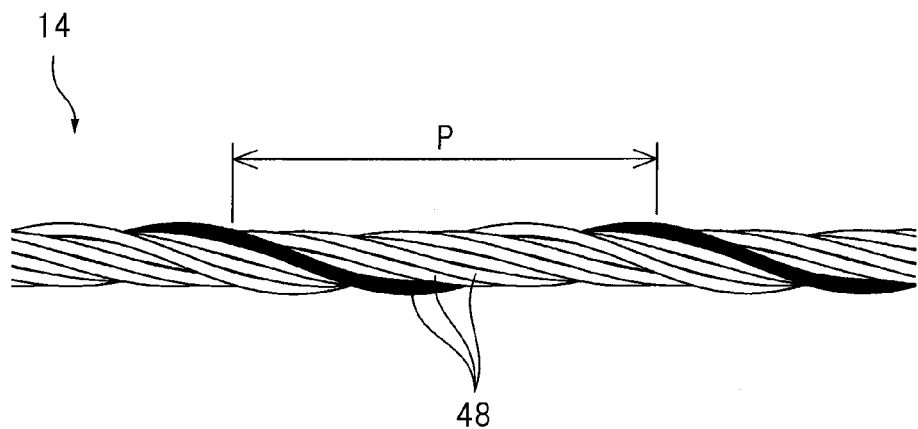
FIG. 5 is a view showing an example of the constitution of the umbilical member.

As shown in FIG. 3b, second fixing member 26 is configured so that umbilical member 14 extending from second fixing member 26 toward the end effector lies on the surface of arm section 20 (in the direction of the tangential line of circle 36 in FIG. 2). Therefore, it is preferable that umbilical member 14 has a certain degree of rigidity or elasticity so that umbilical member 14 does not hang loosely just after extending from second fixing member 26. FIG. 5 shows an example of such an umbilical member. In the example of FIG. 5, a plurality of cables or tubes 48 are combined and integrally twisted so as to constitute substantially one umbilical member (or bundle), the rigidity of which is raised. In such a constitution of the umbilical member, the twisting direction or an amount of the twisting per unit of length (or a pitch "P") of cables or tubes 48 may be determined so as to adjust the rigidity of umbilical member 14, whereby the umbilical member does not outwardly projects in a twisting radial direction of thereof depending on the configuration and/or the condition of the robot arm.

Concretely, in relation to the above two arrangements (the U-shape and the arc-shape) of umbilical member 14, the rigidity of umbilical member 14 is increased, by determining the direction of the twisting of the cables or tubes so that the twisting is tighter when the umbilical member represents the U-shape, whereby the umbilical member is unlikely to hang loosely. Further, in this case, the twisting is looser and the rigidity of umbilical member 14 is lowered when the umbilical member has the arc-shape, whereby the umbilical member can easily lie on the outer surface of the arm section.

Figure 6:
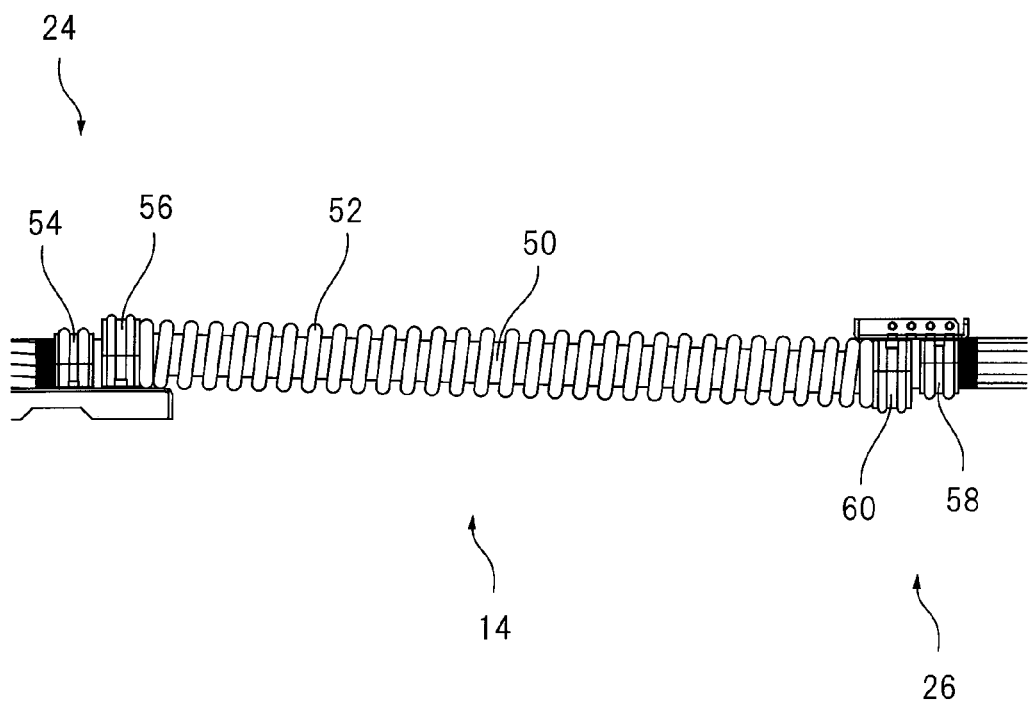
FIG. 6 is a view indicating an example wherein a cover and a coil spring are arranged for the umbilical member.

FIG. 6 shows an example wherein umbilical member 14 is protected by a cover and a spring. Umbilical member 14 is constituted by enclosing the bundle as shown in FIG. 5 with a cylindrical cover 50 made from a textile or a rubber sheet, and inserting cover 50 into a coil spring 52. In the umbilical member constituted as such, the cables or tubes may be effectively protected from external shock or frictional damage.

When the umbilical member as shown in FIG. 6 is used, it is preferable that first fixing member 24 clamps the cables/tubes together with the cover, and clamps the coil spring separately from the cover. Concretely, first fixing member 24 has a cover clamping part 54 adapted to clamp cover 50 and a spring clamping part 56 adapted to clamp coil spring 52. Similarly, it is preferable that second fixing member 26 has a cover clamping part 58 adapted to clamp cover 50 and a spring clamping part 60 adapted to clamp coil spring 52.

Although umbilical member 14 is protected by both cover 50 and coil spring 52 in the example of FIG. 6, only one of cover 50 and coil spring 52 may be used to protect the umbilical member. When coil spring 52 is used, by properly determining a pitch of the spring and/or a diameter of a wire constituting the spring, the umbilical member may be provided with a desired rigidity or elasticity as well as protective function, even if the umbilical member is not constituted as shown in FIG. 5.

According to the present invention, at any angular position of the rotating part, the umbilical member does not widely project from the arm section and is prevented from interfering with external equipment or the like.

By combining and integrally twisting a plurality of cables or tubes so as to form the umbilical member like a bundle, the umbilical member may have proper rigidity or elasticity, whereby the umbilical member does not widely project from the arm section. The rigidity or elasticity of the umbilical member may be adjusted by changing the twisting direction or an amount of the twisting of the plurality of cables or tubes per unit of length.

By providing the cover and/or the coil spring to the umbilical member, the umbilical member may be protected from external shock or the like. Further, when the coil spring is used, the umbilical member may be provided with proper rigidity or elasticity.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An arrangement unit for an umbilical member at a robot arm section, the umbilical member extending to an end effector attached to a front end of a wrist section via a forearm of an industrial robot, the umbilical member being constituted by at least one of a cable adapted to supply power or a signal to the end effector and a tube adapted to supply coolant or activation air to the end effector, the arrangement unit comprising:
   a nonrotating part having a longitudinal axis extending along a longitudinal direction of the forearm;
   a rotating part rotatably attached to one end of the nonrotating part about the longitudinal axis;
   a first fixing member attached to the nonrotating part, wherein the umbilical member is nonslidably fixed to the first fixing member; and
   a second fixing member attached to the rotating part so that the second fixing member may integrally rotate with the rotating part, wherein the umbilical member is nonslidably fixed to the second fixing member,
   wherein the second fixing member is positioned at a place where is separated from the first fixing member in the direction of the longitudinal axis by a distance larger than a size of the umbilical member in a cross-sectional direction thereof, the cross-sectional direction being perpendicular to a longitudinal direction of the umbilical member, and
   wherein, when the rotating part is positioned at a center position of a rotational motion range thereof about the longitudinal axis and in an axial view seen along the longitudinal axis,
      the first fixing member is arranged so as to direct the umbilical member, viewed in the direction of the longitudinal axis, along a first tangential line of a circle having a center coinciding with the longitudinal axis,
      the second fixing member is arranged so as to direct the umbilical member, viewed in the direction of the longitudinal axis, along a second tangential line of the circle, the second tangential line being generally perpendicular to the first tangential line, and
      the first and second fixing members are positioned on the same side of a boundary plane on which the longitudinal axis lies, the boundary plane being parallel to the second tangential line.

2. The arrangement unit as set forth in claim 1, wherein the umbilical member is constituted by combining and integrally twisting a plurality of cables or tubes so as to form a bundle.

3. The arrangement unit as set forth in claim 2, wherein the twisting direction or an amount of the twisting of the plurality of cables or tubes per unit of length is determined so that the umbilical member does not outwardly projects in a twisting radial direction of thereof.

4. The arrangement unit as set forth in claim 1, wherein the umbilical member has at least one of a cover adapted to enclose the umbilical member and a coil spring through which the umbilical member extends.

* * * * *